United States Patent [19]
Johnson

[11] Patent Number: 4,930,181
[45] Date of Patent: Jun. 5, 1990

[54] AUXILIARY TOOL HANDLE

[76] Inventor: Samuel V. Johnson, 32 Cherry Tree Rd., Loudonville, N.Y. 12211

[21] Appl. No.: 200,451

[22] Filed: May 31, 1988

[51] Int. Cl.⁵ ............................................. B25G 1/10
[52] U.S. Cl. .................................. 16/110 R; 16/125; 16/DIG. 24; 294/58; 81/489
[58] Field of Search ................ 16/114 R, 110 R, 125, 16/127, 113, 119; 294/58, 57; 74/543, 554, 557; 81/177.1, 177.2, 177.5, 489

[56] References Cited

U.S. PATENT DOCUMENTS

| | | | |
|---|---|---|---|
| 758,482 | 4/1904 | Smith | 294/58 |
| 933,647 | 9/1909 | Hunt | 294/58 |
| 1,901,778 | 3/1933 | Schlag | |
| 2,011,896 | 8/1935 | Grace | 294/58 |
| 2,158,277 | 5/1939 | Dolph | 16/110 R |
| 2,595,695 | 5/1952 | Packer et al. | 240/52.3 |
| 3,014,750 | 12/1961 | Briggs | 294/58 |
| 3,466,078 | 9/1969 | Sholund | 294/58 |
| 4,229,033 | 10/1980 | Vosbikian | 16/110 R |
| 4,690,447 | 9/1987 | Adams | 294/58 |
| 4,701,142 | 10/1987 | Merritt | 294/58 |

Primary Examiner—Nicholas P. Godici
Assistant Examiner—Edward A. Brown
Attorney, Agent, or Firm—Schmeiser, Morelle & Watts

[57] ABSTRACT

An auxiliary tool handle for attachment to cylindrical tool handles, such as those used for garden rakes, hoes, push brooms and the like. The auxiliary tool handle comprises at least one curvilinear handle segment for removable and adjustable mounting on a conventional tool handle. Sleeves for slidable mounting of the handle segments on conventional cylindrical tool handles are attached to the handle segments, thereby enabling adjustable mounting thereof about the circumference and along the length of the tool handle.

14 Claims, 3 Drawing Sheets

AUXILIARY TOOL HANDLE

FIELD OF THE INVENTION

The present invention relates generally to tool handles. More particularly, this invention is an auxiliary handle for attachment to conventional tools, such as garden rakes, hoes, push-pull brooms and the like.

BACKGROUND OF THE INVENTION

When doing work in a yard or garden, it is often necessary to use tools, such as rakes, shovels or hoes, which require great physical exertion in order to be effective. The bending and pulling necessary to use tools with long, straight handles results in stress and strain to the back and arms, as well as to other body parts, depending upon the work involved and the individual's method of tool employment. The strain can be especially harmful to those who use the above described tools only a few times yearly, and thus are not conditioned for such exertion. Even for those Who use long-handled tools regularly, the strain involved cannot be endured for extended periods of time; thus, efficiency is impaired.

Still another problem associated with the use of tools of the type described above is the frequent occurrence of hand blisters, due to the pressure necessarily applied to the handle as strokes are taken.

The present inventor has developed an auxiliary tool handle for use on conventional rakes and the like which reduces the strain on the user, thereby allowing the user to accomplish more work without experiencing potentially severe and harmful body pain or blisters. The present invention is not only safe to use, but is easily and conveniently attachable to conventional tool handles.

The major advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

The present invention is an auxiliary handle for tools, such as rakes, hoes and push brooms which have one or more long, straight, cylindrical handles. The invention comprises curvilinear handle segments which are removably and slidably mountable at variable positions along the length and about the circumference of the tool handle. In one embodiment, the auxiliary handle comprises a continuous, circular handle member With a number of radial handle members likewise provided for gripping. An alternate embodiment includes a plurality of semi-circular handle segments staggered at variable positions along the tool handle.

The auxiliary handle is affixed to at least one sleeve for encircling a portion of the tool handle and further includes means for removable and adjustable mounting thereon. This invention is most effective in reducing the strain experienced with common straight handled tools. In particular, the user may grip the handle at any point along the curvilinear surface to achieve a stronger, but more comfortable grip. Often this will involve gripping the handle at an angle suitable for achieving a grip where the fingers, prior to closing, are substantially perpendicular to the portion of the handle to be gripped, with the arm also being substantially perpendicular to said gripped portion. This is similar to the type of grip one achieves when climbing a ladder, where the force against the fingers is what we will call a forward force directed against the opening of the fingers, and keeping the fingers from opening maintains the grip. This grip may be contrasted to the straight handled tool grip which is similar to the grip used in rope climbing. With this latter grip the force is what we will call a sideways force, directed toward sliding the rope, or straight handle, sideways through the hand. Maintaining this type of grip requires much more exertion and strength and is of course more likely to produce blisters and cramps. The sideways force also puts a great deal of strain on the forearm muscles, with strain greatly reduced when the forearm is perpendicular to the handle.

Furthermore, for effectiveness, most tools are used at different angles to the work surface. For example, the difference in the angle between raking leaves in the yard as opposed to raking under a bush. Bending over while working causes a great deal of back strain which is a common, and serious ailment experienced by a large portion of the population. In the subject invention, since the curvilinear surfaces move away from the straight handle it is possible, and convenient, to change one's grip, thereby lowering the straight handle Without bending over. Also, the curvilinear handle allows the user to change the various angles of the grip thereby altering the muscles being used and the tYpe of force on these muscles. This variety results in greater endurance without overexerting any particular muscle.

The invention consists in the novel parts, constructions, combinations and improVements herein shown and described. The accompanying drawings referred to herein and constituting a part hereof illustrate preferred embodiments of the invention and together with the description, serve to explain the principles of the invention.

DETAILED DESCRIPTION OF THE DRAWINGS

With reference to FIGS. 1 through 5, three alternate embodiments of the auxiliary tool handle constructed in accordance with the present invention are shown. As illustrated, the auxiliary tool handle, generally designated by the numeral 10, is removably attached to a conventional, cylindrical tool handle 12. Generally, the auxiliary tool handle 10 of the present invention comprises at least one curvilinear handle segment and adjustable mounting means enabling the user to vary the position of the handle segments about the circumference and along the length of the cylindrical tool handle 12. The auxiliary handle 10 may be made of a variety of materials including plastic, metal, or rubber.

Figure 1:
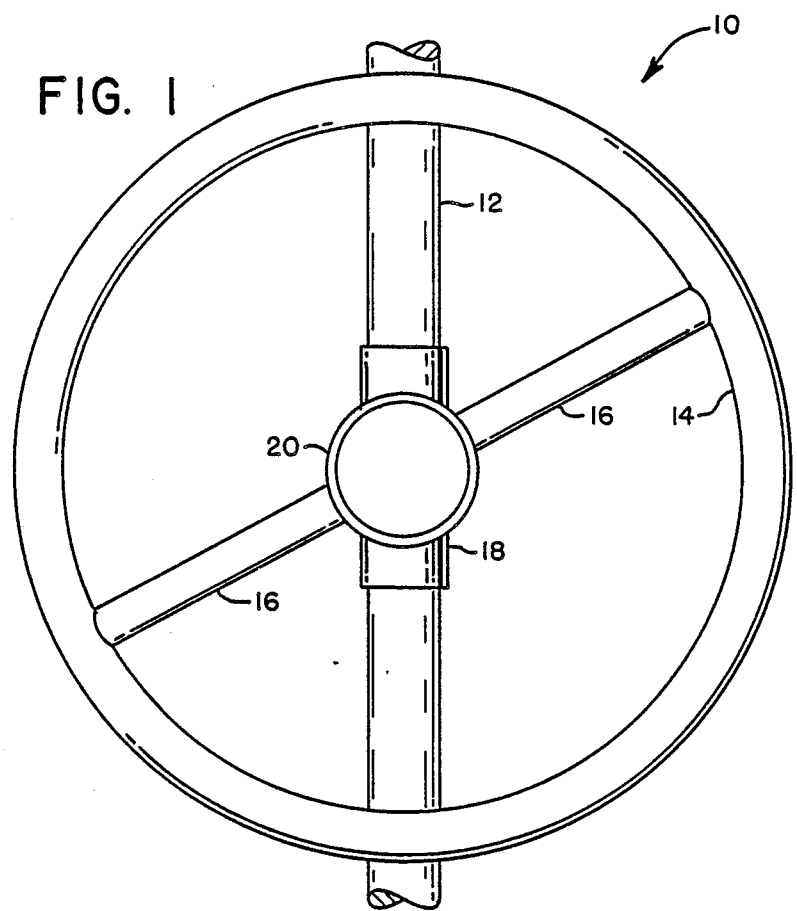
FIG. 1 is a front elevation of the auxiliary tool handle constructed in accordance with the preferred embodiment of the present invention.
Figure 2:
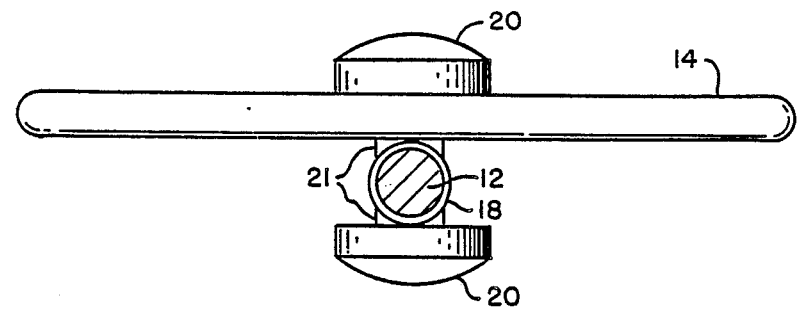
FIG. 2 is a top view of the auxiliary tool handle of FIG. 1, illustrating one mode of adjustable fastening.

In the preferred embodiment of FIGS. 1 and 2, the curvilinear handle segments comprise a continuous, circular handle member 14 and radial handle members 16 for additional gripping means. With the auxiliary tool handle 10 of the preferred embodiment securely in place, the user is thus able to maneuver the tool by grasping the auxiliary handle 10 at any position along the circular handle member 14 and further along the radial handle members 16.

To secure the auxiliary handle 10 to the cylindrical tool handle 12, a sleeve 18 for receiving the tool handle 12 is affixed to the curvilinear handle segments by any appropriate adjustable fastening method, depending upon the materials used to manufacture the auxiliary handle 10 and the sleeve 18. In the preferred embodiment of FIGS. 1 and 2, hubs 20 and brackets 21 are secured by bolts (not shown) extending through the tool handle 12. Alternatively, a clamp may be used to secure the sleeve 18 to the tool handle 10 by bolting the clamp thereto. It is to be understood that any other suitable method of adjustably securing the sleeve 18 to the tool handle 12 may be employed.

Figures 3, 4:
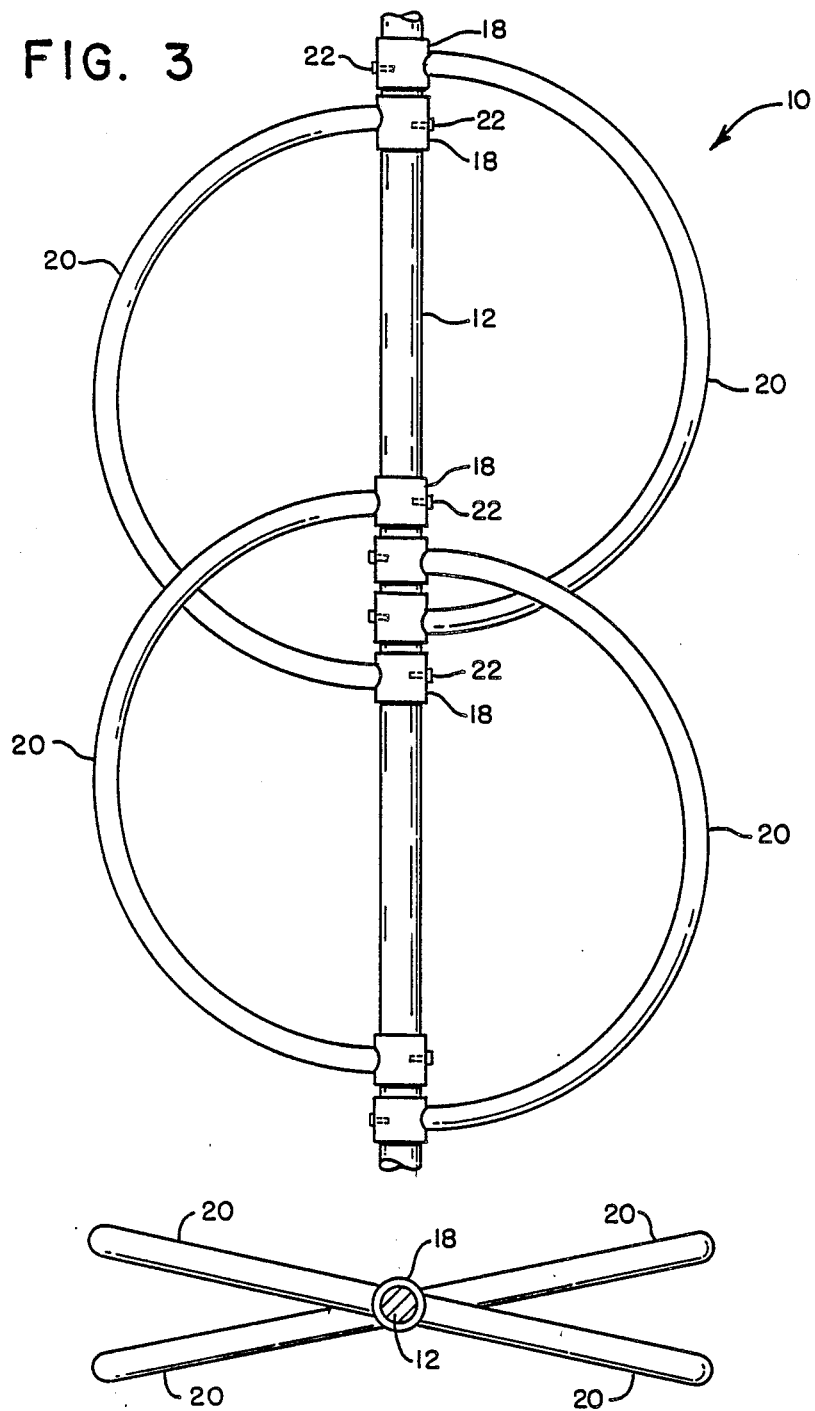
FIG. 3 is an alternate embodiment of the auxiliary tool handle of the present invention.
FIG. 4 is a top view of the alternate embodiment of FIG. 3.

With reference to FIGS. 3 and 4, a first alternate embodiment of the auxiliary tool handle 10 of the present invention is shown. In this version, a variable number of semicircular handle segments 20 are staggered along the tool handle 12. Although either of the above described methods of fastening the sleeve 18 to the tool handle 12 may be employed, set screws 22 are used here to illustrate yet another fastening method.

Figure 5:
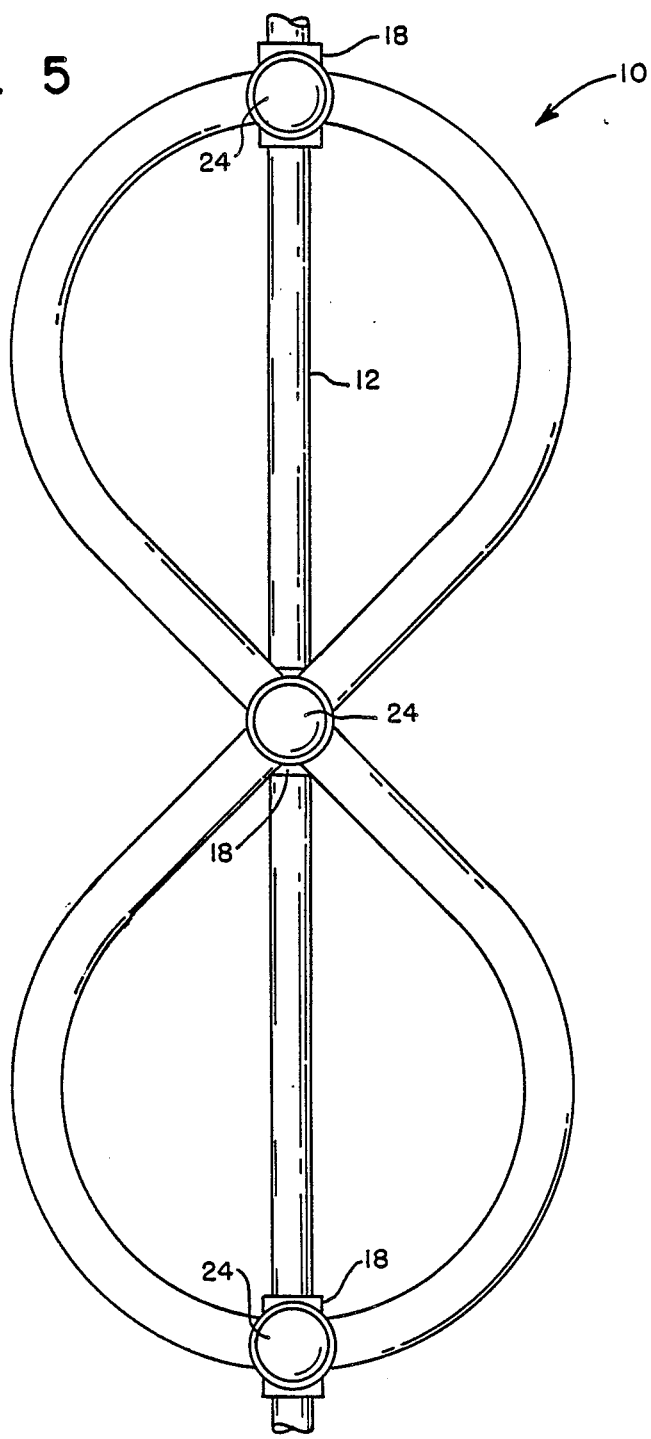
FIG. 5 is still another alternate embodiment of the auxiliary tool handle constructed in accordance with the present invention.

A second alternative embodiment of the present invention is depicted in FIG. 5. In this embodiment, curvilinear handle segments mounted on sleeves 18 are joined to form an auxiliary handle 10 having a figure-eight configuration. Hubs 24 and brackets (not shown) are bolted to the tool handle 10, thereby functioning as the adjustable fasteners in FIG. 3, but any suitable method may be employed as hereinabove described.

In each of the configurations there are at least two segments of the curvilinear handle which are substantially perpendicular to the straight handle. These segments are separated from each other either by the straight handle or by being located in a spaced apart relationship to each other. In either configuration the user may grasp the curvilinear handle on or toward each of the perpendicular segments. Preferably, each end of the curvilinear handle intersects or is secured to the straight handle at substantially a ninety degree (90°) angle. Also, in my preferred embodiment, there are two curvilinear handle sections each of which intersect the straight handle at ninety degrees. These curvilinear sections may be secured to each other as shown in FIGS. 1 and 5 or may be separated as shown in FIG. 3. More descriptively, the two curvilinear segments could be described as a sine wave where the center or "0" zero line is the straight handle. Furthermore, if one were to divide the sine wave into its positive segment and negative segment, and these segments were separately rotatable and slidable along the zero line one could achieve a variety of configurations, each of which embodies the principles of this invention.

Where the tool is a rake or a shovel, portions of the curvilinear handle would intersect the plane in which the tool resides. This may be contrasted to the configuration where a portion of the handle is perpendicular to the straight handle but parallel to the plane of the tool. This latter configuration is found with shovels having straight handles which are bifurcated at one end, with a connecting handle between said bifurcations. Although grasping the connecting handle is easier, the arm must be rotated from its natural position, and no benefit is gained regarding the need of the user to bend over.

In use, the auxiliary tool handle 10 of the present invention allows the user to accomplish the same work as if a conventional tool handle 12 had been used, but more efficiently and without the bending and further straining associated with such tools. In particular, curvilinear auxiliary handle segments at variable positions along the conventional tool handle 12 allow the user to vary his position about the tool with respect to the handle 12 while working. As a result, the user is able to assume more comfortable and varied working positions, thus avoiding painful physical side effects, including back, arm, and leg strain. The occurrence of hand blisters is likewise reduced due to the decrease in amount of pressure needed to be applied to the handle and the consequential reduction in work time. In contrast, conventional tool handles by themselves have practical utility only when the user stands rearwardly of the tool handle and repeatedly bends at the waist while stretching forward and backward in addition to bearing down on the tool.

The invention in its broader aspects is not limited to the specific embodiments herein shown and described, but departures may be made therefrom within the scope of the accompanying claims, without departing from the principles of the invention and without sacrificing its chief advantages.

What is claimed is:

1. A tool handle assembly, comprising:
 a plurality of curvilinear handle segments removably attachable to a substantially straight tool handle; and
 means for varying the position of said curvilinear handle segments about the circumference and along the longitudinal axis of said straight tool handle,
 said curvilinear handle segments in assembly describing a figure eight and said position varying means comprising a sleeve for receiving a portion of the straight tool handle for slidable mounting thereon and adjustable sleeve fastening means.

2. A tool handle assembly comprising an elongate straight tool handle, an auxiliary tool handle including a generally planar circular member disposed in a plane substantially parallel to the longitudinal axis of the straight tool handle;
 adjustable securing means including a straight tool handle-receiving sleeve affixed to the auxiliary tool handle for maintaining the auxiliary tool handle at a predetermined desired location along the length of the straight tool handle; and
 two radial members each of which is affixed at one end to the straight tool handle-receiving sleeve and at the other end to the said circular member.

* * * * *